United States Patent
Takahashi

(10) Patent No.: US 9,120,124 B2
(45) Date of Patent: Sep. 1, 2015

(54) GASKET MATERIAL COMPRISING FLUORORUBBER COMPOUND COATED METAL PLATE AND METHOD FOR MANUFACTURING THE SAME

(75) Inventor: Kazuhiro Takahashi, Shizuoka-ken (JP)

(73) Assignee: U-SUN GASKET CORPORATION, Shizuoka-Ken (JP)

(*) Notice: Subject to any disclaimer, the term of this patent is extended or adjusted under 35 U.S.C. 154(b) by 548 days.

(21) Appl. No.: 13/356,144

(22) Filed: Jan. 23, 2012

(65) Prior Publication Data
US 2012/0225299 A1 Sep. 6, 2012

(30) Foreign Application Priority Data
Mar. 4, 2011 (JP) ................. 2011-047161

(51) Int. Cl.
| | | |
|---|---|---|
| B05D 3/12 | (2006.01) | |
| B05D 7/00 | (2006.01) | |
| F16J 15/00 | (2006.01) | |
| F16J 15/02 | (2006.01) | |
| F16J 15/10 | (2006.01) | |
| F16J 15/12 | (2006.01) | |
| B05D 5/08 | (2006.01) | |
| B05D 7/14 | (2006.01) | |
| B05D 3/04 | (2006.01) | |

(52) U.S. Cl.
CPC .. B05D 7/56 (2013.01); B05D 3/12 (2013.01); B05D 5/083 (2013.01); B05D 7/14 (2013.01); F16J 15/00 (2013.01); F16J 15/02 (2013.01); F16J 15/10 (2013.01); F16J 15/104 (2013.01); F16J 15/12 (2013.01); F16J 15/121 (2013.01); F16J 15/122 (2013.01); B05D 3/0486 (2013.01); Y10T 428/3154 (2015.04)

(58) Field of Classification Search
None
See application file for complete search history.

(56) References Cited

U.S. PATENT DOCUMENTS

| | | | |
|---|---|---|---|
| 4,478,887 A | 10/1984 | Sommer et al. | |
| 5,213,723 A * | 5/1993 | Aoshima et al. | 264/470 |
| 5,731,040 A | 3/1998 | Akita | |
| 5,855,976 A * | 1/1999 | Oyama et al. | 428/36.6 |
| 6,398,224 B1 | 6/2002 | Erb et al. | |

FOREIGN PATENT DOCUMENTS

| | | | |
|---|---|---|---|
| DE | 19735390 A1 | 2/1999 | |
| FR | 666088 A | 9/1929 | |
| FR | 891922 A | 3/1944 | |
| FR | 2512735 A1 | 3/1983 | |
| GB | 644282 A | 10/1950 | |
| JP | 63-96359 A * | 4/1988 | |
| JP | 63-096359 A | 4/1988 | |
| JP | 9-011363 A | 1/1997 | |
| JP | 11-216798 A | 8/1999 | |
| JP | 11-264475 A | 9/1999 | |
| JP | 11-264475 A * | 9/1999 | |
| JP | 2980941 * | 9/1999 | |
| JP | 2980941 B2 | 9/1999 | |
| JP | 2002-310302 A | 10/2002 | |
| JP | 2006-206617 A | 8/2006 | |
| JP | 2009-203276 A * | 9/2009 | |

OTHER PUBLICATIONS

Extended European Search Report for Application No. 12153723.7 dated Jul. 12, 2012.
Notification of Reasons for Refusal (Partial English Translation) dated Jul. 8, 2014 in corresponding Japanese Application.

* cited by examiner

*Primary Examiner* — William Phillip Fletcher, III
(74) *Attorney, Agent, or Firm* — Birch, Stewart, Kolasch & Birch, LLP

(57) ABSTRACT

First a metal plate is coated with a primer layer. Next the metal plate is coated with an adhesive layer over the primer layer. Then the metal plate is coated with a compound that includes an inorganic fiber, an organic fiber, an unvulcanized fluororubber, a peroxide for vulcanization and an inorganic filler over the primer layer and the adhesive layer. Thereafter, the metal plate coated with the compound is hot pressed with the fluororubber being vulcanized.

5 Claims, 2 Drawing Sheets

GASKET MATERIAL COMPRISING FLUORORUBBER COMPOUND COATED METAL PLATE AND METHOD FOR MANUFACTURING THE SAME

BACKGROUND OF THE INVENTION

1. Field of the Invention

This invention relates to a gasket material and a method for manufacturing the same and more particularly to a gasket material formed of a metal plate coated with a compressible material and a method for manufacturing the same.

2. Description of the Related Art

The gasket material disclosed in Japanese Patent Laying-open Publication No. Showa 63-96359 is one of this kind and has a compound including a compressible inorganic fiber other than asbestos, a compressible organic fiber, a rubber and an inorganic filler, and exhibits excellent performances in various physical properties and sealing properties, etc. in spite of not including asbestos.

U.S. Pat No. 5,731,040 and Japanese Patent Laying-open Publication No. Heisei 9-11363 disclosed a method for manufacturing gasket material which allows the metal plate to be coated well with the compound upon manufacturing the gasket material proposed in the aforementioned reference.

However, of the gasket materials proposed by the present inventor, those in practical use have heretofore been using a nitrile rubber (NBR) as a rubber and thereby have problems with acid resistance, heat resistance, oil resistance, compressive resistance, etc. under some circumstances.

SUMMARY OF THE INVENTION

It is accordingly an object of the present invention to provide a gasket material that exhibits excellent acid resistance and a method for manufacturing the same.

It is another object of the present invention to provide a gasket material that exhibits excellent heat resistance and a method for manufacturing the same.

It is still another object of the present invention to provide a gasket material that exhibits excellent oil resistance and a method for manufacturing the same.

It is a further object of the present invention to provide a gasket material that exhibits excellent compressive resistance and a method for manufacturing the same.

It is a still further object of the present invention to provide a gasket material and a method for manufacturing the same wherein the vulcanization of rubber can be achieved well.

The other objects of the present invention will become apparent from the following detailed description.

A gasket material in accordance with the present invention is formed of a metal plate coated with a compound that includes an inorganic fiber, an organic fiber, a rubber and an inorganic filler, wherein the rubber is a fluororubber vulcanized with peroxide.

In a method for manufacturing gasket material in accordance with the present invention, a compound that includes an inorganic fiber, an organic fiber, an unvulcanized fluororubber, a peroxide for vulcanization and an inorganic filler is prepared. A metal plate is coated with a primer layer. The metal plate is then coated with an adhesive layer over the primer layer. The metal plate is further coated with the compound over the primer layer and the adhesive layer. Thereafter, the metal plate that has been coated with the compound is hot-pressed so that the fluororubber is vulcanized.

According to the present invention, because a fluororubber is used as a rubber that constitutes the compound, the gasket material exhibits excellent acid resistance, heat resistance, oil resistance and compressive resistance.

Also, according to the present invention, because the fluororubber is vulcanized with peroxide, a further excellent acid resistance can be obtained.

Also, according to the present invention, because at least the primary vulcanization is performed by hot pressing, but not by open vulcanization as in the conventional art, the vulcanization inhibition by the atmospheric oxygen can be minimized.

Further, in the prior art, it has been necessary to pass the gasket material between rollers to compress it to a desired final thickness prior to vulcanization which has been performed only by open vulcanization. According to the present invention, however, such a procedure is not necessary, because the hot pressing can achieve the necessary compression and the vulcanization at the same time.

In the present invention, the metal plate in the gasket material can be a steel plate, a stainless steel plate, an aluminum plate, or the like.

The inorganic fiber that constitutes the compound can be a glass fiber, ceramic fiber, rock wool, mineral wool, fused quartz fiber, chemical processed high silica fiber, fused alumina silicate fiber, alumina continuous fiber, stabilized zirconia fiber, boron nitride fiber, alkali titanate fiber, whiskers, boron fiber, carbon fiber, metal fiber, or the like.

The organic fiber that constitutes the compound can be an aromatic polyamide fiber, other polyamide fibers, polyolefin fiber, polyester fiber, polyacrylonitrile fiber, polyvinyl alcohol fiber, polyvinyl chloride fiber, polyurea fiber, polyurethane fiber, polyfluorocarbon fiber, phenol fiber, cellulosic fiber, or the like.

The fluororubber that constitutes the compound can be a synthetic rubber containing fluorine in general such as a vinylidene fluoride rubber (FKM), tetrafluoroethylene-propylene rubber (FEPM), tetrafluoroethylene-perfluorovinyl ether rubber (FFKM), or the like.

The peroxide for vulcanizing the fluororubber can be a 2,5-dimethyl-2,5-di(t-butylperoxy)hexane, dicumyl peroxide, 2,4-dichlorobenzoyl peroxide, di-t-butyl peroxide, t-butyldicumyl peroxide, benzoyl peroxide, 2,5-dimethyl-2,5-di(benzoylperoxy)hexane, alpha, alpha'-bis (t-butylperoxyisopropyl) benzene, t-butyl-peroxyisopropyl carbonate, parachloro benzoyl peroxide, t-butyl perbenzoate, or the like.

The inorganic filler that constitutes the compound can be a mica, clay, talc, barium sulfate, sodium bicarbonate, graphite, lead sulfate, tripoli, wollastonite, or the like.

The primer can be an epoxy adhesive or the like that can improve water resistance and the like.

The adhesive to be applied on the primer layer can be an organic silicone adhesive or the like.

In particular aspects of the present invention, the hot pressing is performed under an oxygen-free atmosphere such as a vacuum or inert gas atmosphere, or under a reduced pressure atmosphere. In these aspects, the vulcanization inhibition by the atmospheric oxygen can be perfectly or nearly perfectly prevented and thereby a better fluororubber vulcanization can be achieved.

In another particular aspect of the present invention, the hot pressing is performed under an air atmosphere.

In a more particular aspect of the present invention, the step of hot pressing the metal plate coated with the compound is performed by hot pressing an intermediate product that has been obtained by stamping out the metal plate coated with the compound, not yet vulcanized, into a size larger than a predetermined size of a finished product of the gasket material, and thereafter an outer periphery of the intermediate product is removed to obtain the finished product.

This aspect ensures that the finished product has no incomplete vulcanization parts, even if the hot pressing is performed under a condition such as an air or a reduced pressure atmosphere and the vulcanization is not carried out well in the outer periphery of the intermediate product.

BRIEF DESCRIPTION OF THE DRAWINGS

The foregoing and the other objects, features and advantages of the present invention will become apparent from the following detailed description when taken in connection with the accompanying drawings. It is to be understood that the drawings are designated for the purpose of illustration only and are not intended as defining the limits of the invention.

DETAILED DESCRIPTION OF THE PREFERRED EMBODIMENT

Figure 1:
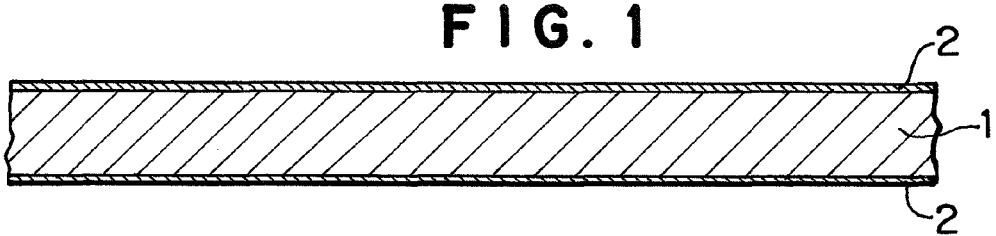
FIG. 1 is a sectional view of a metal plate that has been coated with prime layers in accordance with an embodiment of the present invention.

The present invention will hereunder be described in conjunction with a preferred embodiment of the invention which is shown in the drawings.

A gasket material product is obtained by performing the following steps.

(Step A)

A compound having the following composition is prepared.
(a) Glass fibers 60% by weight
(b) Fibrillated aromatic polyamide fibers (Trade name "Twaron pulp" manufactured by Teijin) 5% by weight
(c) Fluororubber (FKM) 22% by weight
(d) 2,5-dimethyl-2,5-di(t-butylperoxy)hexane (Trade name "Perhexa 25B manufactured by NOF Corporation) 1% by weight
(e) Triallylisocyanurate (TAIC) 2% by weight
(f) Mica powder 10% by weight In the above compound, (a) glass fiber is a compressible inorganic fiber, (b) fibrillated aromatic polyamide fiber is a compressible organic fiber, (d) 2,5-dimethyl-2,5-di(t-butylperoxy)hexane is a peroxide for vulcanization, (e) Triallylisocyanurate is a vulcanizing aid, and (f) Mica powder is an inorganic filler.

At this point, the fluororubber has not yet been vulcanized. The compound is blended with a solvent, a methyl isobutyl ketone (MIBK), to a consistency like paste or clay. Instead of the methyl isobutyl ketone, other solvent such as ketone solvent (such as methyl ethyl ketone (MEK)) or ether solvent (such as butyl acetate or ethyl acetate) can be used.

(Step B)

Separately from the step A, as shown in FIG. 1, a 0.3 mm thick metal plate formed of steel is coated on both faces with a primer 2 layer formed of an epoxy adhesive that can improve water resistance and the like. After having been applied, the primer 2 layer is dried by air-drying. It should be understood, however, the primer 2 layer can also be dried in other ways, for example, can be dried at a temperature of from 70 to 80 degrees centigrade (.degree. C.) for approximately 30 minutes in a furnace. Also, instead of the drying process, a pre-baking can be performed at a temperature of from 100 to 130.degree. C. for approximately 30 minutes.

(Step C)

Figure 2:
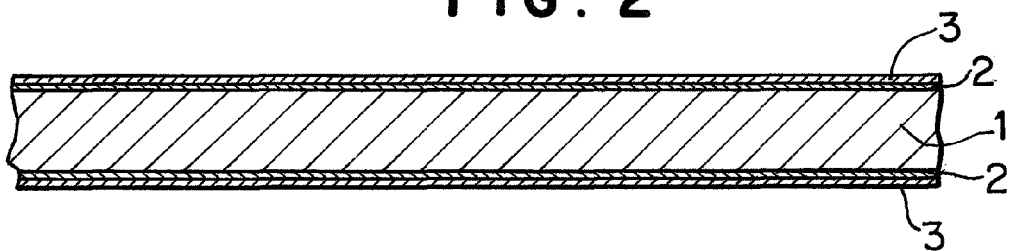
FIG. 2 is a sectional view of the metal plate that has been coated with adhesive layers over the prime layers in accordance with the embodiment.

Following the application and drying of the primer 2 layer, as shown in FIG. 2, the metal plate 1 is coated on both faces with an about 10 micrometer (.mu.m) thick layer of a heat resistant adhesive 3 over the primer 2 layer. The heat resistant adhesive 3 is an organic silicone adhesive and is applied over the primer 2 layer as by dipping the metal plate 1 into a solution of the adhesive that has been dissolved in a solvent. The adhesive 3 layer can also be applied to the metal plate 1 by other processes, such as a process using a conventional coater.

Thereafter, the coated metal plate 1 is dried at a temperature of from 70 to 80.degree. C. for approximately 30 minutes, which drying preferably takes place in a furnace. Instead of the drying process, a pre-baking can be performed at a temperature of from 100 to 130.degree. C. for approximately 30 minutes.

(Step D)

Figure 3:
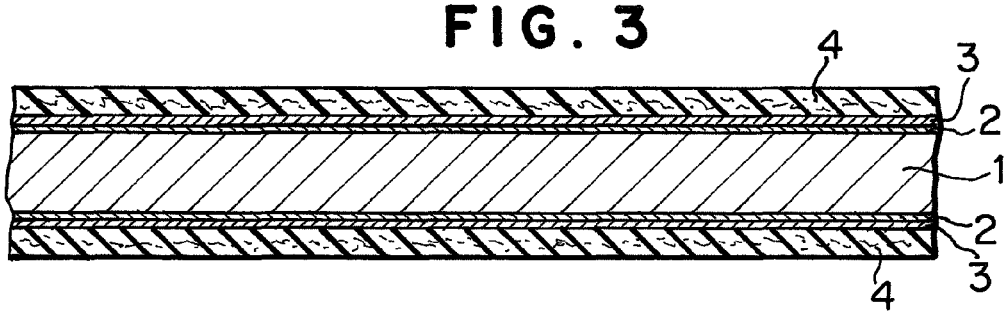
FIG. 3 is a sectional view of the metal plate that has been coated with a compound over the prime layers and the adhesive layers in accordance with the embodiment.

As shown in FIG. 3, each surface of the metal plate 1 coated with the adhesive layer 3 is additionally coated with an approximately 50 to 200 .mu.m thick layer 4 of the compound that has been prepared in the step A with a consistency resembling paste or clay. This coating can be well performed, for example, as disclosed in U.S. Pat No. 5,731,040 and Japanese Patent Laying-open Publication No. Heisei 9-11363, by inserting the metal plate 1 between first and second metal rollers that are arranged adjacent and parallel to each other and rotated at different circumferential speeds to one another and in opposite directions, and by supplying the compound 4 between the metal plate 1 and the first roller that is turned at a circumferential speed that is slower than that of the second roller.

Following the above coating process, the compound 4 is air-dried.

(Step E)

Figure 4:
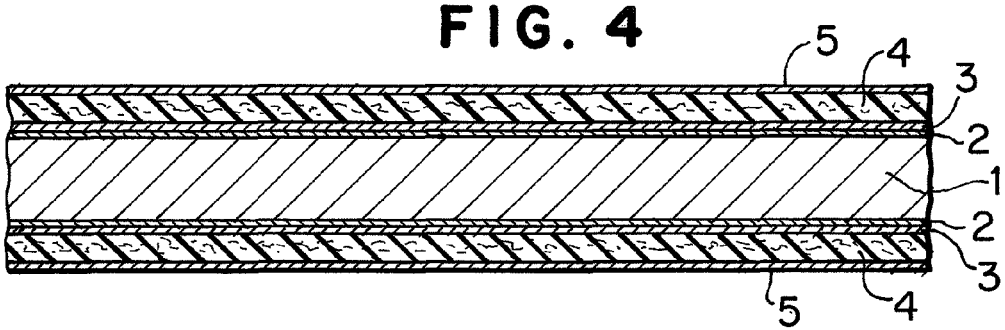
FIG. 4 is a sectional view of the metal plate that has been coated with anti-stick layers over the compound in accordance with the embodiment.

Both surfaces of the metal plate 1 that have been coated with the compound 4 in the step D are further coated with an anti-stick layer, as shown in FIG. 4, in a conventional manner. The anti-stick 5 layer is to prevent the gasket material from sticking to surfaces between which the gasket material is placed, and is formed of graphite added with a synthetic resin. The synthetic resin is added to the graphite so as to enable the graphite to be applied to the compound 4 layers. The thickness of the individual anti-stick 5 layers is preferably 2 to 3 .mu.m, respectively.

(Step F)

Following the step E, the metal plate 1 that has been coated with the compound 4 is stamped out, by press working, into a size larger than a predetermined size a finished product 9 (see FIG. 6) of the gasket material should have.

(Step G)

Figure 5:
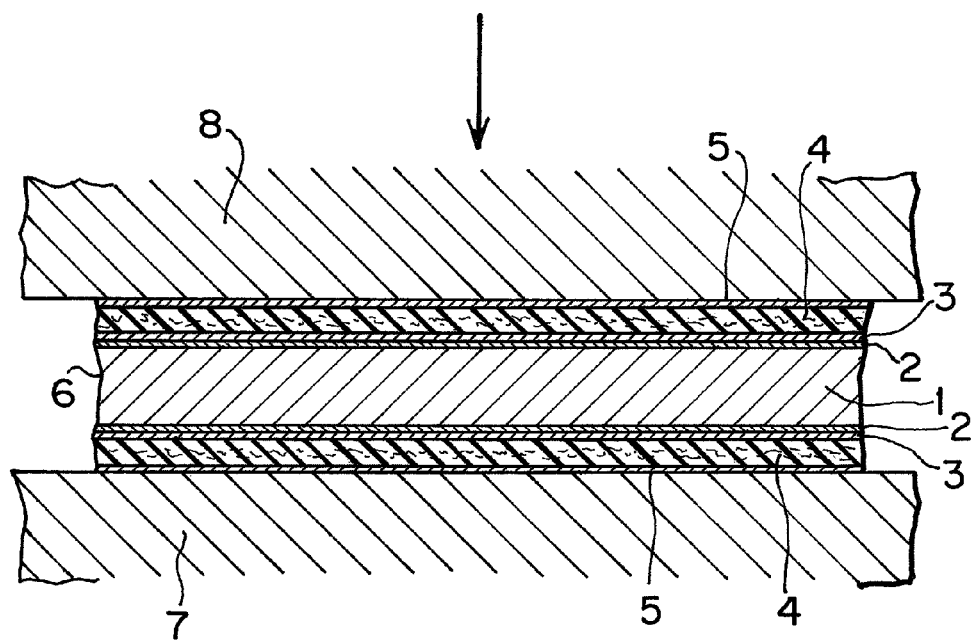
FIG. 5 is a sectional view showing a step of hot pressing the metal plate coated with the compound as an intermediate product of a gasket material in accordance with the embodiment.

The intermediate product 6 that has been obtained by the stamping-out in the step F is hot pressed, as shown in FIG. 5, sandwiched between a lower die 7 and an upper die 8, at a temperature of 170.degree. C. for 10 minutes, under an air atmosphere, to achieve peroxide vulcanization of the fluororubber in the compound 4 and cross-linking of the synthetic resin in the anti-stick 5 layers and to compress the compound 4 by about 10% so as to obtain a predetermined final thickness.

(Step H)

Following the step G, the fluororubber of the intermediate product 6 is open vulcanized, as secondary vulcanization, at a temperature of 180.degree. C. for 4 hours to make up for the primary vulcanization in the step G in case it has been incomplete, to stabilize the shape and properties of the gasket material and to remove residual harmful substances such as hydrofluoric acid and peroxide in the compound.

(Step I)

Figure 6:
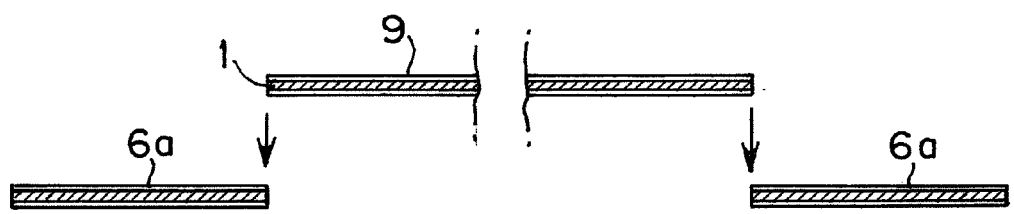
FIG. 6 is a sectional view showing a step of removing an outer periphery of the intermediate product to obtain a finished product of the gasket material after the hot processing in accordance with the embodiment.

Following the step H, as shown in FIG. 6, the intermediate product 6 is stamped out, by press working, into the finished product 9 with the outer periphery 6a of the intermediate product 6 being removed. If necessary, bead forming on the gasket material is performed at the same time as the stamping out of the intermediate product 6 into the finished product 9.

According to this gasket material and method for manufacturing the same, because a fluororubber is used as the rubber that constitutes the compound 4, the gasket material exhibits excellent acid resistance, heat resistance, oil resistance and compressive resistance.

Also, according to this gasket material and method for manufacturing the same, because the fluororubber is vulcanized with peroxide, a further excellent acid resistance can be obtained.

Also, according to this method for manufacturing the gasket material, because the primary vulcanization is performed by hot pressing, but not by open vulcanization as in the conventional art, the vulcanization inhibition by the atmospheric oxygen can be minimized.

Further, in the prior art, it has been necessary to pass the gasket material between rollers to compress it to a desired final thickness before vulcanization which heretofore has been performed only by open vulcanization. According to this manufacturing method, however, such a procedure is not necessary, because the hot pressing can achieve the necessary compression and the vulcanization at the same time as in the step G.

In the aforesaid embodiment, since the hot pressing is performed under an air atmosphere, there is a tendency for the vulcanization not to be carried out well in the outer periphery 6a of the intermediate product 6. However, the removal of the outer periphery 6a of the intermediate product 6 as shown in FIG. 6 in the step I ensures that the finished product 9 has no incomplete vulcanization parts.

Though the hot pressing is performed under an air atmosphere in the aforesaid embodiment, it can be performed under an oxygen-free atmosphere such as vacuum or inert gas (such as nitrogen, argon or helium) or under a reduced pressure atmosphere. In such a case, since the vulcanization inhibition by the atmospheric oxygen can be perfectly or nearly perfectly prevented, a better fluororubber vulcanization can be achieved, which eliminates the need for removal of the outer periphery of the gasket material after the fluororubber vulcanization or minimizes the outer peripheral part of the gasket material to be removed.

Though in the aforesaid embodiment, open vulcanization is performed as a secondary vulcanization, in this invention such open vulcanization is not always required.

In this invention the thicknesses of the primer layer, the adhesive layer, the metal plate and the compound layer are not limited to those of the aforesaid embodiment.

While, in the aforesaid embodiment, the metal plate 1 is shown and described as being coated with the compound 4 over both faces, it should be understood that the metal plate may be coated with the compound over one face only, within the scope of this disclosure.

Further, though in the aforesaid embodiment, the metal plate 1 coated with the unvulcanized compound 4 is stamped out into the small intermediate products 6 and thereafter each of the intermediate products 6 is hot pressed, the metal plate 1 can be hot pressed while still being in its original large size and thereafter stamped out into desired size pieces.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a gasket material formed of a metal plate coated with a composition comprising an inorganic fiber, an organic fiber, a rubber, and an inorganic filler, said method comprising the steps of:
    preparing a composition comprising an inorganic fiber, an organic fiber, an unvulcanized fluororubber, a peroxide for vulcanization, and an inorganic filler;
    coating a metal plate with a primer layer;
    coating said metal plate with an adhesive layer over said primer layer;
    coating said metal plate with said composition over said primer layer and said adhesive layer;
    stamping out said metal plate coated with said composition, unvulcanized, into an intermediate product having a size larger than a predetermined size of a finished product of said gasket material;
    hot pressing said intermediate product coated with said composition, thereby vulcanizing said fluororubber; and
    after the step of hot pressing said intermediate product coated with said composition, removing an outer periphery of said intermediate product to obtain said finished product.

2. The method for manufacturing the gasket material as set forth in claim 1, wherein the step of hot pressing said intermediate product coated with said composition is performed under an oxygen-free atmosphere.

3. The method for manufacturing the gasket material as set forth in claim 1, the step of hot pressing said intermediate product coated with said composition is performed under a reduced pressure atmosphere.

4. The method for manufacturing the gasket material as set forth in claim 1, wherein the step of hot pressing said intermediate product coated with said composition is performed under an air atmosphere.

5. The method for manufacturing the gasket material as set forth in claim 1, further comprising, after the step of hot pressing said intermediate product coated with said composition, the step of open vulcanizing said fluororubber.

* * * * *